United States Patent [19]
Clark

[11] Patent Number: 5,431,129
[45] Date of Patent: Jul. 11, 1995

[54] TRANSPARENT PET CAGE WITH PIVOTING TOP PANELS

[76] Inventor: Donna S. Clark, 426 SW. 44th Ter., Cape Coral, Fla. 33914

[21] Appl. No.: 201,580

[22] Filed: Feb. 25, 1994

[51] Int. Cl.⁶ ..................... A01K 31/00; A01K 31/12
[52] U.S. Cl. .......................................... 119/26; 119/15
[58] Field of Search ................... 119/17, 19, 26, 15

[56] References Cited

U.S. PATENT DOCUMENTS

| | | | |
|---|---|---|---|
| 1,389,199 | 8/1921 | Leonard | 119/17 |
| 2,522,391 | 9/1950 | McGonigle | 119/17 |
| 2,769,426 | 11/1956 | Bromley | 119/17 |
| 3,834,352 | 9/1974 | Gervis | 119/19 |
| 5,134,969 | 8/1992 | Mason et al. | 119/17 |
| 5,156,640 | 10/1992 | Del Rosario | 119/17 |

FOREIGN PATENT DOCUMENTS

| | | | |
|---|---|---|---|
| 778507 | 3/1935 | France | 119/17 |
| 671685 | 1/1939 | Germany | 119/17 |
| 3126930 | 2/1983 | Germany | 119/17 |
| 2140267 | 11/1984 | United Kingdom | 119/17 |

OTHER PUBLICATIONS

"Plastic Bird Cage", *Science Illustrated*, p. 85, Nov. 1946.

*Primary Examiner*—Todd E. Manahan

[57] ABSTRACT

A cage for housing birds or small animals is fabricated from a transparent rigid material and has a plurality of walls, ventilation holes formed in the walls, an access door, a bottom tray, a feeder, perches, and a pair of cage top panels, each of which is hingedly attached to the walls. The cage top panels open to a vertical position and a playpen perch is placed between and attached to the opened cage top panels thereby forming a self-contained playpen top.

4 Claims, 2 Drawing Sheets

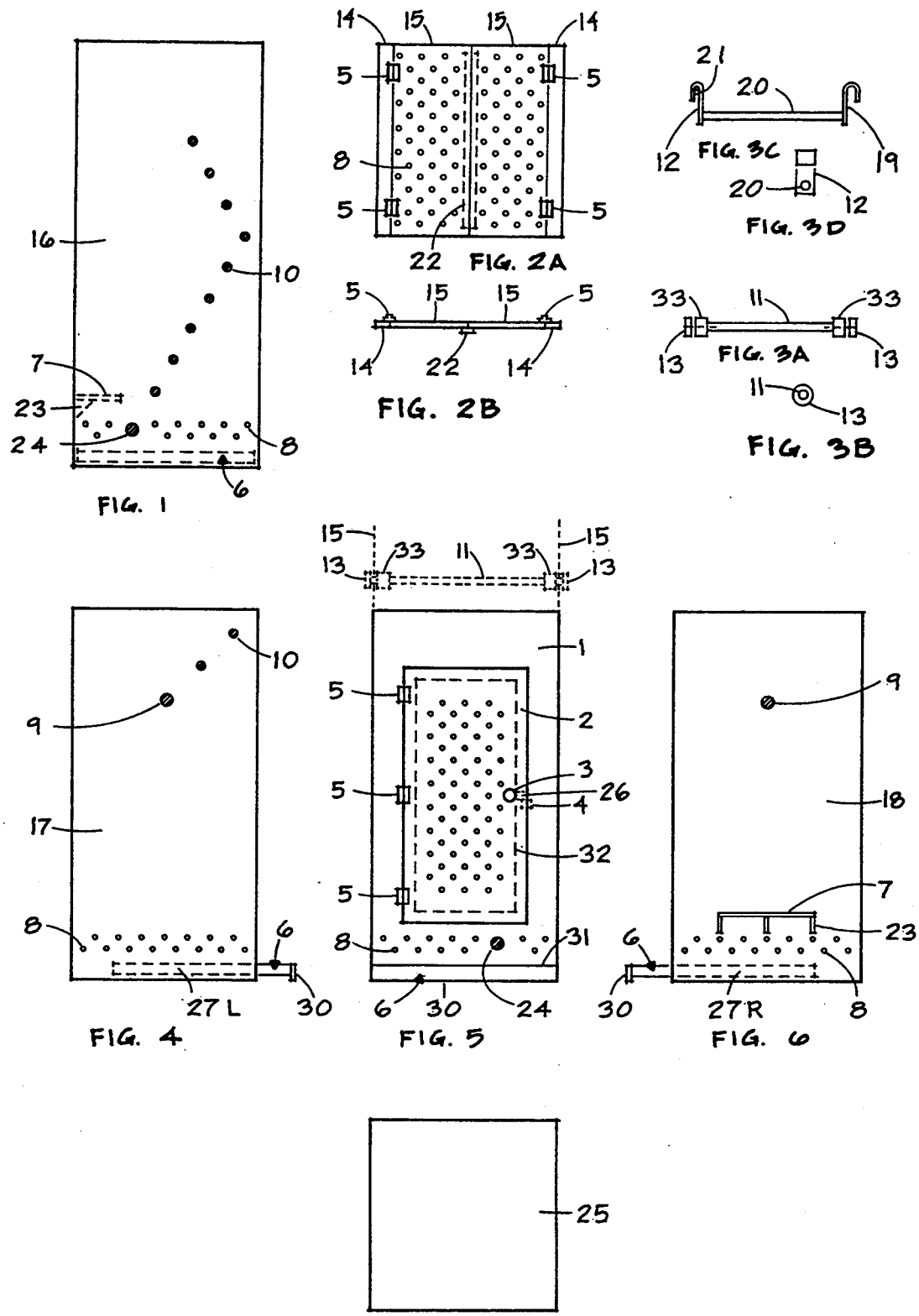

TRANSPARENT PET CAGE WITH PIVOTING TOP PANELS

BACKGROUND—FIELD OF INVENTION

This invention relates to animal housing, more specifically to improved cages for housing birds. This invention further includes structural features to 1) provide a more healthy and safe environment for the pet and 2) provide a cleaner, healthier, and more pleasant environment for the pet owner.

BACKGROUND—DESCRIPTION OF PRIOR ART

Birds have traditionally been housed in cages having a solid bottom and having sides and tops of a combination of vertical bars and horizontal crossbars which are intended to confine the bird. These cages have been constructed of various materials such as wood, aluminum, brass, wrought iron or powder coated steel, or other types of metal.

The wood cages are not appropriate for large or aggressive birds because they are not durable. Birds have an inherent tendency to chew wood as they would do in the wild. It is a method of sharpening their beak. The metal cages such as aluminum, brass, and wrought iron cages are durable, but have several problems. After a period of use, they lose their attractiveness as the metals corrode, chip, or rust. Additionally, galvanized wire cages have recently been linked to New Cage Syndrome which causes death.

The bar and crossbar design of the traditional cages poses a safety hazard for the birds as evidenced by numbers of birds dying by strangulation after getting their head caught between the bars. When these birds then cannot get a safe hold with their beak or feet, they slide down the bar until they reach the crossbar where they are strangled by hanging or their neck is broken.

This traditional bar/crossbar design also has other problems. It cannot prevent drafts from reaching the birds. While ventilation is a must, drafts can cause a bird to get pneumonia from which it is difficult or impossible to recover, and treatment is expensive.

For bird owners, a major concern is the amount of debris that is scattered around the cage. Birds fling their seeds, foods, and feces onto the surrounding floors and walls. Cleanup involves not only the cage, which must be kept clean for the health of the bird, but the surrounding environment which must be kept clean for the health of the owner.

One reason many people want to own birds is for their beauty and colorfulness. Unfortunately, the traditional bar/crossbar cage detracts from this beauty by hiding the bird behind prison bars.

Generally, the cages have one size perch, and only one perch in a cage. Standing for long periods on the same size perch has been shown to cause birds to get sore feet.

Also, the traditional design cannot offer any degree of noise control over loud or continuous lung/voice exercise.

Most cages are designed simply to provide a confined area for the bird.

U.S. Pat. No. 293,945 issued Jan. 26, 1988, to Ken Grant, illustrates what appears to be a solid-sided bird cage with a mesh top. Doors are attached by four hinges which run the full height of the cage and appear to be metal. There is one perch at the top of the cage and two small cups for feed and water near the bottom of the cage on opposite walls. Tooth-like vents are at the bottom near a slide out tray which is open on the sides and back. No dimensions are given, but it appears that the cage may be for small birds, based on the diameter of the perch and feed cups. Problems inherent in the design include but are not limited to: if the hinges are metal, corrosion can occur; the perch at the top of the cage is the only perch; the feed and water cups are located near the bottom of the cage with no perch in front of either cup for the bird to rest on while eating. The cups are too high above the floor of the cage for the bird to stand on the floor while eating. One perch with only one diameter does not allow the bird to rest its feet since they are constantly crimped in one position. There does not appear to be any way for the bird to get from the only perch to the bottom of the cage where the feed/water cups are located. The possibility of activity in the cage is not encouraged and appears to be limited, and therefore, does not promote the health of the bird. The slide out tray has no sides to prevent litter/bedding from falling during changing.

U.S. Pat. No. 3,785,343 issued Jan. 15, 1974, to Hilda E. Baratta, assigned to Raymond Lee Organization, Inc., is for a cage which is partially fabricated of transparent plastic material and provides separate compartments for sleeping and bathing. One problem with the design is the implementation of the traditional bar/crossbar combination although it is plastic. The same health hazard is present as in the traditional cages which do not have transparent sleeping/bathing compartments. Also, no provision for encouraged exercise is present as there is only one perch and a relatively restrictive area.

There were two ads in the classified ads of the February, 1993, Bird Talk magazine for acrylic bird cages. One ad was for a set of plans so the bird owner can construct their own cage. These plans are being sold by Jim Parrish, 2338 Liberty St., Cuyahoga Falls, Ohio 44221. It is unknown whether he is the inventor. Aside from the fact that most people do not have the ability to construct their own cage because they do not have the space, tools, or mechanical inclination, some problems with the plans are: the cage is limited to small birds because baking racks are set against two side walls of the cage for the purpose of hanging feed and water cups, allowing the bird to climb, and providing a way to attach the perch. The legs which baking racks have act as standoffs against the side of the cage so the bird's feet can wrap around them. However, it would be easy for the bird's feet to become tangled in some racks or for the bird not to be able to get a good grasp on other racks, and therefore, slide down the rack. Step 12 of the plans states to leave a ¾" opening along the top edge of the sides when bolting the top in place. This may be a danger for some birds who are small enough to get their head stuck in the opening.

The other ad was by Chauvin's Custom Cages, Daniel & Pat Chauvin, 210 Engeron St., Houma, La. 70363. From the information provided, the Chauvin's make 3 sizes acrylic carrying cages and 4 sizes of home cages. Home cages, or those intended to house the birds on a permanent basis, are 16"×16" for Lovebirds, 18"×18" for Cockatiels and Conures, 20"×20" for African Greys and Amazons, and 24"×24" for Cockatoos. The dimensions of these cages do not allow for great activity among the birds as is needed to maintain good health.

As most cages are, they are designed merely to provide a confined area for the bird. Ventilation holes are drilled in the top of the cage, so the natural properties of air circulation have not been considered.

No patent number or patents pending are noted on either cage or cage plans. During my patent search, these cages were not found nor were any solid-sided bird cages located other than U.S. Pat. No. 3,785,343 and U.S. Pat. No. 293,945.

OBJECTS AND ADVANTAGES

Accordingly, several objects and advantages of the present invention are that:

a) It eliminates the bars and crossbars thereby providing a safer environment for the bird by eliminating the possibility of death by hanging/strangulation.
b) The solid sides prevent drafts from reaching the bird, thereby eliminating the danger of catching pneumonia or respiratory disease caused by drafts.
c) The solid sides prevent debris/feces from being thrown outside the cage, thereby keeping the surrounding area clean and reducing associated health concerns.
d) The solid sides muffle noise made by the bird.
e) The transparency allows the full beauty of the bird to show through by eliminating the "prison bar" effect of traditional cages.
f) It also allows the bird to feel free and, thus, happier.
g) The transparent design blends with all decors.

The design of this solid-sided, transparent cage further considers other factors important to the health of birds.

h) Various size perches are used throughout the cage for climbing, sitting, and feeding. This allows the bird's feet to rest by varying the grip required.
i) The feed cups are distanced from the primary roosting perch to encourage exercise.
j) Ventilation holes have been placed to take into account the natural properties of air flow, i.e., holes along the bottom of the cage allow cool air to enter, and holes on the top allow the warmer air to escape as it rises; therefore, the air naturally circulates throughout the cage.
k) Cleanup of the interior of the cage is facilitated by a large access door on the front of the cage. This makes it easy for the bird owner to spray the interior walls and wipe them clean. A removable, glide out bottom tray makes it easy to change bedding material or paper used on the bottom to catch seeds/feces.

Birds that engage in play are healthier birds because this activity prevents the bird from turning on itself and pulling out feathers or other undesirable habits. For this reason, the present invention is designed with a built-in playpen. The top of the cage is divided into two panels, each hinged on one side, so that it can open. A perch placed between the doors attaches to them, holding them in an upright position. The bird can then climb onto the self-contained playpen where it is in the open and free to interact with family members. This is important to the bird and the bird owner. Having the playpen built into the cage eliminates the need to purchase a separate stand for this purpose, and frees floor space which would be required by a separate stand. It also eliminates added cleanup caused by a separate stand since any droppings fall back into the cage.

Recent medical studies have shown that families who keep a bird in the home have increased risk of lung cancer. The risk increased as the duration of the harboring increased. It is not known at this time what factor(s) causes this increased risk. Possibilities being studied include: fungus which can be found in the droppings can release spores which can be inhaled; feathers and/or powders may be irritate the lungs. The solid-sided cage by nature confines feathers and the majority of the powders and spores to the inside of the cage; therefore, it may aid in reducing the risk of lung cancer associated with bird ownership, if these factors are determined to be the causative factors. Any such benefit has not been proven at this point, and is speculative, but may exist.

Further objects and advantages of this invention will become apparent from review of the drawings and descriptions.

BRIEF DESCRIPTION OF THE DRAWINGS

FIG. 1 shows the rear panel of the cage as viewed face on from the outside of the cage.

FIG. 2A shows the top panels of the cage as viewed from above.

FIG. 2B shows a detail of the left top panel stop which is attached to the right top panel. The view angle is planar.

FIG. 3A shows the playpen perch which is inserted between the top panels when they are in the open position to create the playpen.

FIG. 3B shows an end view of the playpen perch.

FIG. 3C shows an alternate playpen perch.

FIG. 3D shows an end view of the alternate playpen perch.

FIG. 4 shows the left panel of the cage as viewed face on from the outside of the cage with the glide out tray assembly in a partially open position to illustrate removal capability.

FIG. 5 shows the front panel and access door as viewed face on from the outside of the cage, and a phantom view of a playpen perch in use.

FIG. 6 shows the right panel of the cage as viewed face on from the outside of the cage also with the glide out tray assembly in a partially open position.

FIG. 7 shows the bottom panel of the cage.

REFERENCE NUMERALS IN DRAWINGS

Figure 8:
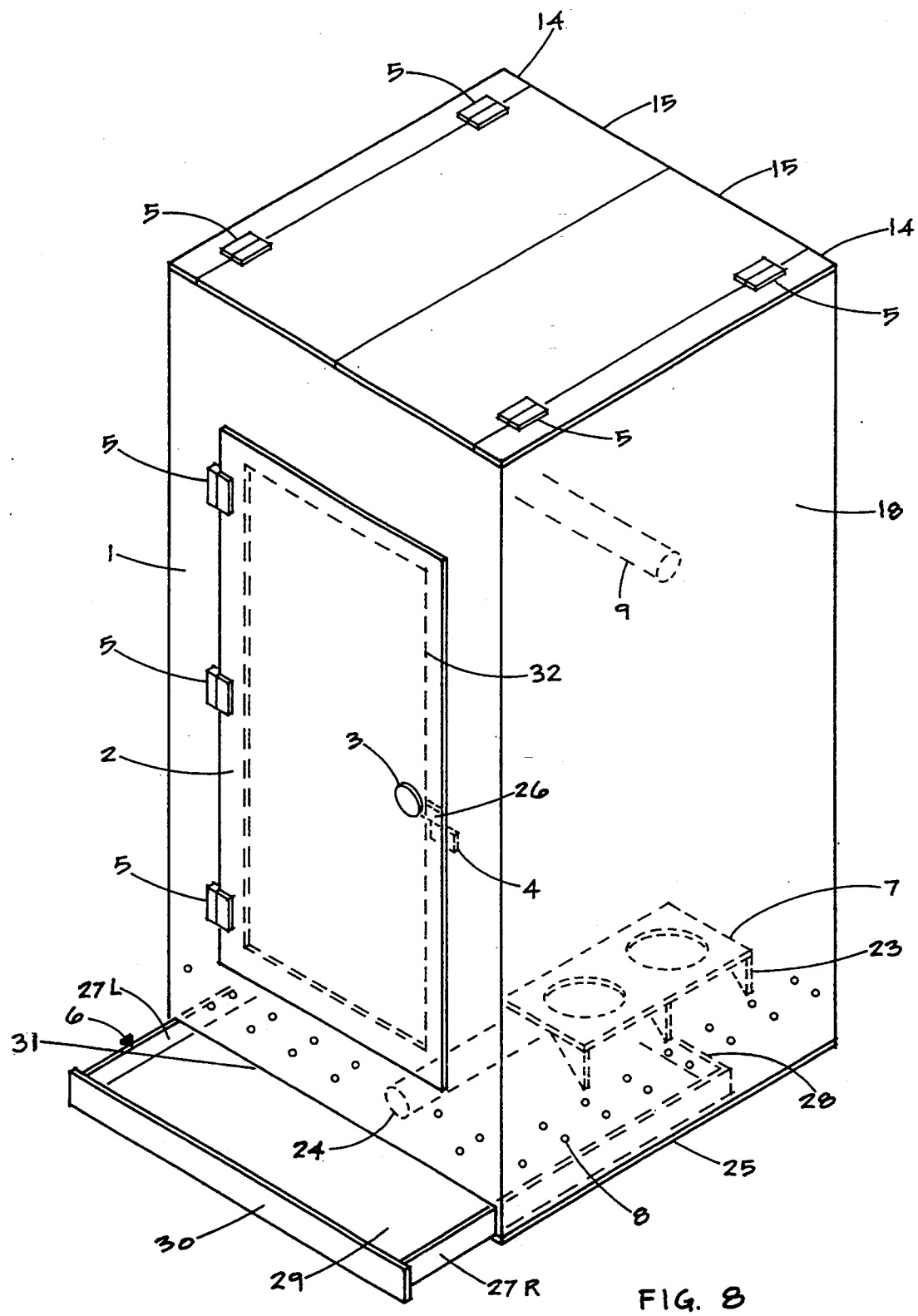
FIG. 8 shows a perspective view of the cage fully assembled. Ventilation holes in the door and top, and climbing perches on the rear panel have been omitted for ease of illustration. The glide out tray is shown partly out to illustrate its removability.

1 Cage Front Panel
2 Front Access Door
3 Door Knob
4 Door Latch Rest
5 Hinges
6 Glide Out Tray Assembly
7 Feed Cup Platform
8 Ventilation Holes
9 Upper Perch
10 Climbing Perches
11 Playpen Perch
12 Alternate Playpen Perch Left Hook
13 Outer Playpen Perch End Caps
14 Top Panel Hinge Rests
15 Cage Top Panels
16 Cage Rear Panel
17 Cage Left Panel
18 Cage Right Panel
19 Alternate Playpen Perch Right Hook 20 Alternate Playpen Perch
21 Alternate Playpen Perch Hook Leveling Stop
22 Top Panel Stop
23 Triangular Feed Cup Platform Supports
24 Lowest Perch (Feeding Perch)
25 Cage Bottom Panel
26 Door Latch
27 Glide out Tray Left Side Panel
29 Glide out Tray Right Side Panel
30 Glide out Tray Rear Panel
31 Glide out Tray Bottom Panel
32 Glide out Tray Front Facing
33 Inner Playpen Perch End Caps

PREFERRED EMBODIMENT OF THE INVENTION

In the preferred embodiment of the transparent, solid sided cage, being shown in full assembly in FIG. 8, the cage assembly and parts are comprised of transparent hard plastic such as acrylic and/or non-breakable plastic, such as General Electric's LEXAN. It is recommended that at least cage top panels 15 be non-breakable material, such as LEXAN to prevent more aggressive birds from being able to damage or break said panels when they are in the upright position with playpen perch 11 or 20 inserted between them. In the open position, it is feasible that a curious, playful or aggressive bird sitting on said playpen perch might bite said panels. By using non-breakable plastic, said panels should not break, thereby eliminating damage to said panels and/or injury to the bird.

Referring to FIG. 1 showing cage rear panel 16, said acrylic panel measures approximately 24" wide, 48" high and ¼" thick.

Ventilation holes 8 at the bottom of said panel 16 are drilled approximately ⅜" in diameter with spacing between each hole 3" on center. Lower row is located approximately 4" above the bottom edge of said panel 16 with the first hole being approximately 2¼" from the right or left edge. Upper row is located approximately 5½" above the bottom edge of said panel 16 with the first hole drilled approximately 1¼" from the right or left edge. Said ventilation holes could be larger or smaller, more or less rows, and higher or lower placement on said panel as long as they provide adequate ventilation to maintain a healthy, safe environment. However, consideration should be given to size/placement so as not to compromise the structural integrity of said panel 16 or the cage assembly. Also, holes should not be large enough to allow debris to fall through, and thereby eliminate one of the objects and advantages.

Lowest perch or feeding perch 24 is acrylic rod approximately 1½" in diameter and approximately 24" long. One end of said perch 24 is attached to said rear panel 16 at approximately 3¾" from bottom edge of said panel 16 and approximately 7" from the left edge of said panel 16 with acrylic adhesive. The other end will be attached to cage front panel 1 when all sides are assembled together in the location described in FIG. 5 below.

Climbing perches 10 are acrylic rods approximately 1" in diameter and approximately 7" long. Said perches 10 are adhered to said panel 16 in a stairway fashion with approximately 5" to 7" between each climbing perch in this embodiment. The distance between said climbing perches can and should be adjusted to accommodate the ability of the size bird to be housed. Working from the bottom of said panel 16 upwards, placement of said first climbing perch 10 is approximately 10" above the bottom edge of said panel 16 and approximately 11" from the right edge of said panel 16.

Glide out tray Assembly 6 is described in detail following FIG. 8 detailed description.

Referring to FIGS. 2A and 2B, the top of the cage comprises two cage top panels 15, top panel stop 22, two top panel hinge rests 14, and four hinges 5. Each of said top panels 15 are approximately 10¾"×24"×¼" thick. Acrylic can be used for said panels 15; however, a non-breakable plastic such as LEXAN is highly encouraged to prevent damage to said panels and to promote the safety of the bird being housed.

Hinges 5 are acrylic hinges approximately 1¾" long×1½" wide attached with acrylic adhesive. Of course, an alternate hinge material could be used. One hinge 5 is adhered to the top plane of the left edge of one top panel 15 approximately 2" from the upper edge and a second in the same manner at approximately 2" from the lower edge. This procedure is repeated in the same manner on the top plane of the right edge of the other top panel 15. If desired, additional hinges could be added and is recommended for cages exceeding 24" deep.

There are two acrylic top panel hinge rests 14, each being approximately 1¼" wide×24" long×e,fra 1/4" thick. One hinge rest 14 is adhered to hinges 5 on the left side of the left top panel 15, and one hinge rest 14 is adhered to hinges 5 on the right side of the right top panel 15. Said hinges 5 are adhered to the top plane of said hinge rests 14. Said hinge rests 14 will also be adhered to left panel 17 and right panel 18 in the final cage assembly.

Said ventilation holes 8 placed 3" on center and being ⅜" in diameter are drilled in each said panel 15 beginning approximately ½" from the hinged edge of said panel 15 and approximately 1" from the top or bottom edge of said panel 15.

Top panel stop 22 is an acrylic strip approximately 23" long×¾" wide×⅛" thick. It is adhered only to right top panel 15 along the unhinged side. It is not adhered to left top panel 15 as this would prevent said panels 15 from opening. Top panel stop 22 allows left top panel 15 to rest against said stop 22 and prevent said top panels 15 from collapsing inside the cage.

Referring to FIG. 3A playpen perch 11 comprises an acrylic rod approximately 1" in diameter and approximately 17¾" long having adhered to each end an inner acrylic disc 33 approximately 2" in diameter and approximately 1¾" thick. In the center of said disc 33 is drilled a hole to accommodate a threaded metal rod approximately 1½" long×¼" in diameter.

Outer playpen perch end caps 13 are acrylic discs approximately 2" in diameter and ¾" thick. Said threaded metal rod is inserted into each end cap 13 by drilling an appropriate size hole, placing adhesive into the cavity, and threading said rod into said end cap 13 to approximately ¾". Said threaded rod is then threaded into the hole drilled in said disc 33 at each end of playpen perch 11. No adhesive is used on this end as it would prevent said end cap 13 from being removed. Removal of said cap 13 is necessary to place said perch 11 between said top panels 15 to form the self-contained playpen.

FIG. 3B is an end view of playpen perch 11 when assembled.

When assembled playpen perch 11 is being utilized, said top panels 15 are in an upright position; said drilled hole in each of inner end caps 33 is over one of said ventilation holes 8 at an appropriate distance from said top climbing perch 10 shown in FIG. 4 to permit the bird easy access; said threaded rod of said outer end cap 13 is inserted into said drilled hole in said inner end caps 33 and tightened.

Referring to FIG. 3C, an alternate embodiment of the playpen perch is illustrated. Alternate playpen perch 20 is an acrylic rod 1" in diameter by approximately 20⅜" long.

Alternate playpen perch right hook 19 is a strip of acrylic approximately 4" wide × 12" long. Said hook 19 is bent so that when finished the side of said hook 19 which is adhered to said perch 20 is approximately 7" long, the inner gap at the top of the bend is approximately ⅜" wide. Said bend continued to angle inward along the remaining length to a finished inner gap at the bottom of said hook of approximately ¼" (which is the thickness of said top panel 15 over which it will be placed).

Alternate playpen perch left hook 12 is a strip of acrylic approximately 4" wide × 12" long. Said hook 12 is bent so that when finished the side of said hook 12 which is adhered to said perch 20 is approximately 7" long and the inner gap at the top of the bend is approximately ¼" wide. Alternate playpen perch hook leveling stop 21 is an acrylic square approximately ⅛" × ¼" thick. Said leveling stop 21 is inserted and adhered on the inside bend near the outer edge of said hook 12 in a level position. When placed over the said left top panel 15, this stop serves to compensate for said top panel stop 22 on said right top panel 15 to hold perch 20 in a level position.

Said hook 19 is positioned so that the long side is to the left, and the short side is to the right. Said perch 20 is placed against the left planar surface of the long side of said right hook 19 at a position approximately ⅜" above the lower edge with the center of said perch 20 at approximately 2" from the edges of the 4" sides and secured with adhesive.

Said left hook 12 is positioned so that the long side is to the right, and the short side is to the left. Said said perch 20 is placed against the right planar surface of the long side of said left hook 12 at a position approximately ⅜" above the lower edge with the center of said perch 20 at approximately 2" from the edges of the 4" sides and secured with adhesive.

FIG. 3D is an end view of playpen perch 20.

When assembled said alternate playpen perch 20 is utilized, said top panels 15 are in an upright position; said alternate playpen perch right hook 19 is positioned over said right top panel 15 until the bend in said right hook 19 rests against the edge of said top panel stop 22. Said alternate playpen perch left hook 12 is positioned over said left top panel 15 until said leveling stop 21 rests against said left top panel 15.

Referring to FIG. 4, cage left panel 17 is approximately 24" wide × 48" high × ¼" thick acrylic. Said ventilation holes 8 are drilled in the same manner as in said rear panel 16 described in FIG. 1 above.

Upper perch 9 is an acrylic rod 1½" in diameter and approximately 24" wide. One end is attached to said left panel 17 by acrylic adhesive and is positioned approximately 12" from the top edge of said panel 17 and approximately 9¾" from the left edge of said panel 17. The opposite end will be attached in the same manner to cage right panel 18 in the final assembly except that it will be approximately 9¾" from the right edge of said panel 18 and approximately 12" from the top edge of said panel 18.

Two said climbing perches 10 approximately 1" in diameter and approximately 7" long are adhered to said panel 17 in a stairway fashion. The upper of said perch 10 is placed approximately 5" from the right edge and 3" from the upper edge of said panel 17. The lower of said perch 10 is placed approximately 8" from the right edge and approximately 8" from the upper edge of said panel 17. These climbing perches 10 enable the bird to climb from upper perch 9 onto playpen perch 11 or 20 when the self-contained playpen is being utilized.

Said glide out tray assembly 6 is shown in a partially open position to illustrate removal capability. Said tray assembly 6, including glide out tray front panel 30 and glide out tray left side panel 27L, are described in detail following FIG. 8 detailed description.

Referring to FIG. 5, cage front panel 1 is approximately 24" wide × 46¼" high × ¼ thick acrylic. Said panel 1 is approximately 1¾" shorter than said panels 16, 17, and 18 to accommodate said glide out tray assembly 6. In the final assembly, the top edge of said front panel 1 will be adjacent to and at the same level as the top edge of said left panel 17 and said right panel 18, thereby leaving gap 31 approximately 1¾" between the bottom of said panel 1 and cage bottom panel 25.

Said ventilation holes 8 are drilled in the same manner as described in FIG. I said rear panel 16 above except that the lower row is approximately 2¼" from the lower edge of said panel 1. This is due to said front panel being approximately 1¾" shorter than said panels 16, 17, and 18. Making this adjustment aligns said ventilation holes 8 on said panels 1, 16, 17, and 18 at the same level. Such alignment is purely aesthetic, and, of course, could be modified.

In said front panel 1, opening 32 measures approximately 15½" wide × 31¾" high. Said opening 32 is located approximately 6½" above the lower edge of said panel 1 and 4" from the right edge of said panel 1. Over said opening 32 is placed front access door 2 which measures approximately 16½" wide × 33" high × ¼" thick. Three said hinges 5 are adhered to the left edge of said front access door 2 with one said hinge 5 located approximately 2½" from the bottom edge of said door 2, one said hinge 5 approximately 2½" from the top edge of said door 2, and a third said hinge 5 centered between said top and bottom hinges. Said door 2 is centered over opening in said panel 1, and said hinges 5 are adhered to said front panel 1.

Door knob 3 comprises a 1½" diameter × 1/2" thick acrylic disc adhered to a 1" diameter × ½" thick acrylic disc with the flat sides together and their centers aligned to each other.

Door latch 26 comprises a 1" diameter × ½" thick acrylic disc and a bar approximately 2½" long × ¾" wide × ¼" thick. The wide flat side of said bar is placed over the flat side of said 1" diameter disc so that the corners of one end of said bar lay approximately ⅛" inside the outer rounded edge of said 1" diameter disc and secured with acrylic adhesive.

Said door knob 3 is placed on the outer side of said door 2 with said 1" disc against the planar surface of said door 2 at approximately 15½" from the top of said door 2 and approximately 2½" from the right edge of said door 2. Said latch 26 is at the same location on the inner planar side of said door 2 with the flat surface of said 1" disc against said door 2. The centers of said 1" disc of said knob 3 and said 1" disc of said latch 26 are aligned with each other. From the inner side of said front access door 2 a hole is drilled to accommodate a ⅛" diameter screw approximately 1/2" long beginning at the center of door latch 26 and continuing through said door 2 and into said knob 3 for a total distance through all members of approximately ½". Said screw is inserted to join said latch 26, said door 2, and said knob 3. Said screw is tightened to a degree that said knob 3 can be turned and said latch 26 will move freely in a circular motion.

Door latch rest 4 is an acrylic square approximately ¾"×¾"×¼" thick. Approximately 23½" from the top of said front panel 1 and approximately ¼" from the right edge of the opening in said panel 1, said latch rest 4 is attached with adhesive.

Said lowest perch 24 is adhered to said front panel 1 at approximately 2" from the bottom edge and approximately 7" from the right edge of said panel 1.

Said glide out tray assembly 6, including glide out tray front panel 30, instructions follow FIG. 8 detailed description.

Referring to FIG. 6, right panel 18 is acrylic approximately 24" wide×48" high×¼" thick. Said upper perch 9 is adhered as described in FIG. 4 above.

Said ventilation holes 8 are drilled as described in said rear panel 16 in FIG. 1 above.

Feed cup platform 7 is approximately 12¾" long×6" wide×¼ thick acrylic having circular holes approximately 4¾" in diameter. One hole is cut approximately ½" from a long edge of said platform 7 and approximately 1¾" from a narrow edge of said platform 7. A second hole of the same size is cut at the same location from the other end of said platform 7. These holes accommodate feed and water cups; and therefore, should be adjusted appropriately to receive the size cups being utilized.

There are three triangular feed cup platform supports 23. Each is approximately 2¼" right angle triangle. One said support 23 is adhered to said platform 7 abutting an outer edge of a long side of said platform 7 at a location approximately center, positioning one of the two equal sides against said platform 7 and the other equal side coming off said long edge of said platform 7 at a 90 degree angle. The two remaining said supports 23 are adhered at equal distance from said center support and abut the same long edge as said center support 23 and in the same manner. Said platform 7 and said platform supports 23 are adhered to said right panel 18 at a location approximately 8" above the bottom edge of said panel 18 and approximately 3" from the left edge of said panel 18.

Said glide out tray assembly 6, including glide out tray front facing 30 and glide out tray right side panel 27R, are described in detail following FIG. 8 detailed description.

Referring to FIG. 7, cage bottom panel 25 is a square approximately 24"×¼" thick acrylic.

Referring to FIG. 8, said front panel 1, said left panel 17, said right panel 18, and said rear panel 16 are bonded together at 90 degree angles with acrylic adhesive.

Said cage bottom panel 25 is adhered to the lower edges of said panels 16, 17, and 18. Because said front panel 1 is shorter to accommodate said glide out tray assembly 6, it will not touch said bottom panel 25.

Said assembled top panels 15 and said top panel hinge rests 14 are placed over the upper edges of assembled said panels 1, 16, 17, and 18 with said hinges 5 facing up. One free long side of one said top panel hinge rest 14 is adhered to said right panel 18. The other said top panel hinge rest 14 is adhered to said left panel 17 in the same manner. The short sides of said hinge rests 14 are adhered to said front panel 1 and said rear panel 16. Said top panels 15 are not adhered as this would prevent said panels from opening to utilize the self-contained playpen.

Glide Out Tray Assembly 6

Said glide out tray assembly 6 comprises glide out tray bottom panel 29, said glide out tray front facing 30, glide out tray rear panel 28, said glide out tray right side panel 27R, said glide out tray left side panel 27L.

Said glide out tray bottom panel 29 is approximately 23½" wide×23¾" long×¼" thick.

Said tray rear panel 28 is approximately 23½" long×1¾" high×¼" thick acrylic. Said panel 28 is adhered to said panel 29 the top edge of the rear of bottom panel 29 flush along the outer edge at a 90 degree angle with the 1¾" being the height and the 23½" running the width of said panel 29.

Said side panels 27R and 27L are acrylic strips approximately 23½" long×1¾" high×¼" thick. Said side panel 27R is adhered to the top edge of the right side of said tray bottom panel 29 along the outer edge in the same manner as above with the 1¾" being the height and the 23¼" running the length of said panel 29. Said panel 27L is adhered in the same manner to the left side of said panel 29. The adjoining edges of said panels 27L and 28 are adhered to each other, and the adjoining edges of said panels 27R and 28 are adhered to each other.

Glide out tray front facing 30 is approximately 24" long×2" high×¼" thick acrylic. Said facing 30 is adhered at a 90 degree angle with the 2" being the height and 24" length running along the front edge of said bottom panel 29. The top edge of said facing 30 is aligned with the top edge of the adjoining said right panel 27R and the top edge of said left panel 27L. It is adhered to said bottom panel 29, said right panel 27R and said left panel 27L. Said facing panel 30 will extend approximately ¼" below the lower edge of said bottom panel 29 and approximately ¼" past the outer edges of said panels 27R and 27L. Thus, when said glide out tray assembly 6 is placed inside gap 31 at the bottom of said front panel 1, the outer edges of said facing 30 will be flush with the outer edges of said left panel 17, said right panel 18, and said cage bottom panel 25.

Another embodiment of said invention would increase the length said rear panel 16 and said front panel 1 to create an oblong cage, such as approximately 36" long×approximately 48" high×¼" thick. In this embodiment, one of said top panel hinge rests 14 would be widened so as to cover the added length of said panels 1 and 16; that is, instead of being approximately 1⅛" wide, one said hinge rest 14 would be approximately 13⅜" wide and adhere to said front panel 1, said rear panel 16, and said right panel 16 OR said left panel 17. Said upper perch 9 would be extended from 24" to 36". Additional said climbing perches 10 could be added if desired to increase potential for activity and/or resting.

Another embodiment of said cage could increase the length of said front panel 1 and said rear panel 16 to 36" long and decrease the height of said panels 1, 16, 17, and 18 to 36" high or less. Said top panels 15 and said upper perch 9 would be adjusted as cited above, and said climbing perches 10 increased, decreased or remain the same. Said left panel 17 and said right panel 18 would be decreased to a height equal to said panel 1 and said panel 16.

Another embodiment of said invention could retain the 24" depth, reduce it, or increase it, and adjust affected components appropriately. Height, width and depth can be reduced to say 24"×24"×24" or any desired measurement and affected components adjusted appropriately.

Another embodiment could eliminate the self-contained playpen and substitute a top panel which would not open.

Thus, it is obvious that the size and shape of the present invention is easily changed; therefore, the preferred embodiment is merely for illustrative purposes and is not intended to limit the invention to the dimensions or sizes or forms disclosed. The scope of the invention should be determined by the appended claims and their legal equivalents, rather than by the examples given.

While the present invention can sit directly on the floor, for ease of cleaning and interaction with the bird or animal housed, it can be placed on a stand which raised said glide out tray assembly 6 to a more comfortably accessed height. Possibilities include but are not limited to a transparent acrylic cube or stand, wooden stand, wrought iron stand, formica covered stand, etc.

SUMMARY, RAMIFICATIONS, AND SCOPE

In summary, the present invention overcomes many of the problems inherent in the traditional housing for birds in that:

it prevents drafts from reaching the bird by utilizing solid sides;

it promotes the health of the bird by providing a means for promoting activity of the bird by providing climbing perches, various diameter perches to allow the feet to rest, distancing feed and water cups from the roosting perch thus requiring the bird to climb;

it provides a built-in playpen for activity and interaction with family members;

it confines the debris and feces to the interior of the cage thereby providing a healthier surrounding for the pet owner;

it eliminates the prison effect housing and provides a pleasant atmosphere for the bird and allows its beauty (one of the reasons for bird ownership) to be enjoyed;

it provides for easy cleanup by utilizing a large access door and glide-out tray;

it capitalizes on the natural properties of air circulation to provide adequate ventilation;

it eliminates the danger of hanging/strangulation by eliminating dangerous bars/crossbars.

The specificities contained herein should not be construed as limiting the scope of the invention, but merely providing illustrations of one embodiment of the invention. For example, any form of solid in the plastic family, forms of glass, or other transparent material deemed safe may be used in the construction. These materials may be combined with each other or other materials such as wood, laminates, and/or metals. The shape and sizes of the whole and/or the parts can and should be altered to accommodate the size of bird/animal housed, and/or the preference of the pet owner. For example, a cage may be square, rectangular, oblong, octagonal, hexagonal, triangular, circular, trapezoidal, etc. Short perches can be replaced with longer or vice-versa. Front access door can be larger, smaller or hinge on the opposite side, top, or bottom. Wood, metal or an alternate hard plastic perches/ladders could be substituted for the acrylic embodiment herein. Perch diameter and distance between perches can and should be varied to accommodate the size of the bird to occupy the cage. Alternate materials could be used for the hinges, latches, feed cups and holder. Ventilation holes could be placed in different locations, in different numbers, in different size and/or different shapes or any combination thereof. One or more sides could be made of a solid, but non-transparent material. A combination of solid sides, with one or more sides being non-solid such as mesh could be used. Filtering systems and/or heating systems could be added. A stand to hold the cage could be attached, or detached but still incorporated as a part of the design. Thus, the scope of the invention should be determined by the claims rather than by the preferred embodiment shown.

Having set forth and disclosed the present invention I claim:

1. A pet cage assembly comprising:
   a plurality of solid walls, at least one of which is transparent, said walls including a plurality of ventilation holes formed therein and a first wall having a door opening formed therein;
   an access door connected to said first wall for selectively closing said door opening;
   means for selectively latching said door in a closed condition;
   feeding means fixed to at least one of said walls;
   at least one lower perch element fixed to said walls;
   a pair of cage top panels pivotally attached to said walls and having a plurality of ventilation holes formed therethrough, said cage top panels being pivotal between a generally horizontal, closed condition and a generally vertical and parallel open condition;
   an elongate playpen perch element having opposite end portions;
   an attachment means for releasably attaching each said end portion of said playpen perch element to a respective said cage top panel when said cage top panels are in said open condition such that said playpen perch element extends generally between said open cage top panels.

2. The assembly of claim 1 in which said cage top panels are transparent.

3. A pet cage assembly comprising:
   a plurality of generally vertical walls, at least one of which is transparent;
   a pair of cage top panels pivotally attached to said walls, said cage top panels pivoting between a generally horizontal closed condition and a generally vertical and parallel open condition;
   an elongate playpen perch element; and
   means for releasably attaching said playpen perch element to each of said cage top panels, when said cage top panels are in said open condition, such that said playpen perch element extends generally between said open cage top panels.

4. The assembly of claim 3 in which said cage top panels are transparent.

* * * * *